April 19, 1938.　　S. G. MARGLES ET AL　　2,114,805
MOVING STAIRWAY
Filed March 30, 1937　　2 Sheets-Sheet 1

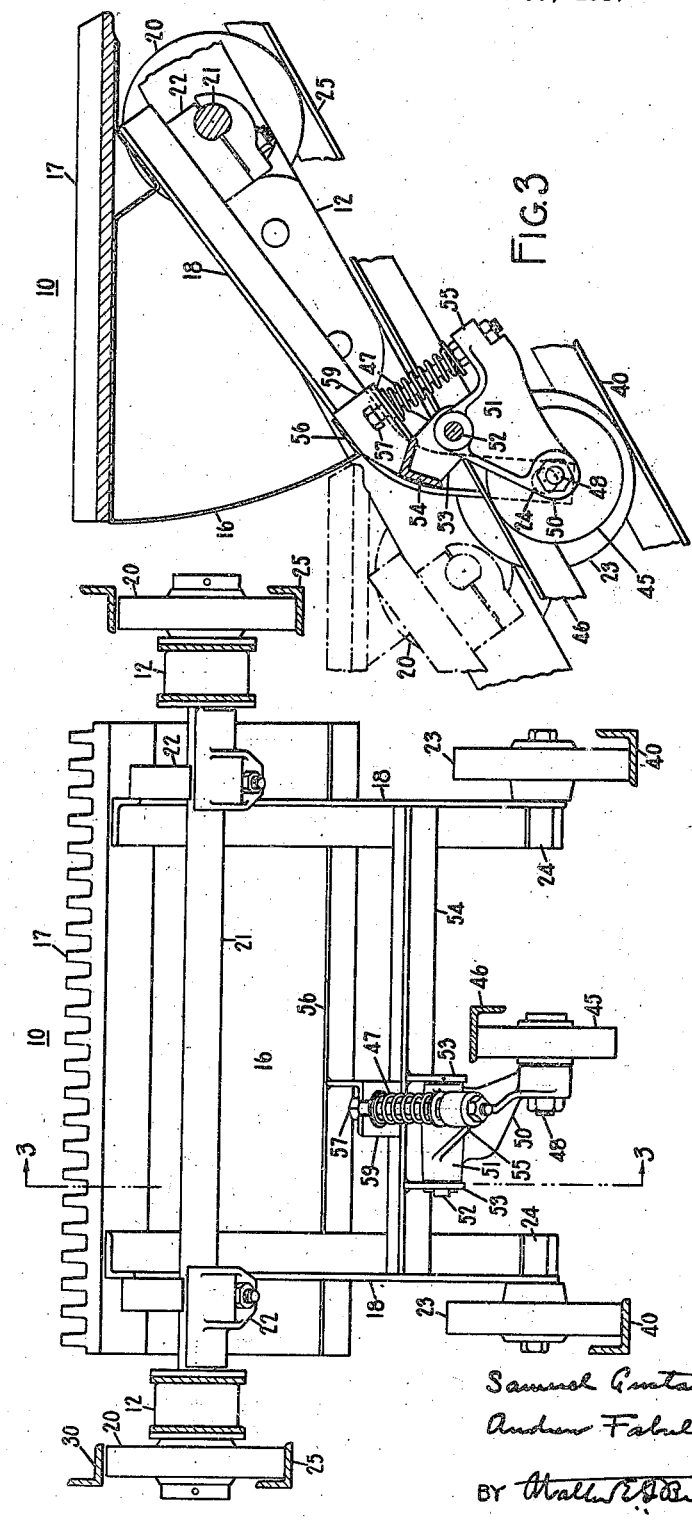

Patented Apr. 19, 1938

2,114,805

UNITED STATES PATENT OFFICE 2,114,805

MOVING STAIRWAY

Samuel Gustave Margles, Brooklyn, N. Y., and Andrew Fabula, Bayonne, N. J., assignors to Otis Elevator Company, New York, N. Y., a corporation of New Jersey Application March 30, 1937, Serial No. 133,770

10 Claims. (Cl. 198—16)

The invention relates to moving stairways.

Moving stairways comprise an endless series of steps which are moved from one landing to another for the purpose of conveying passengers. The steps are connected together by means of sprocket chain, known as running gear chain. It has been the practice for a considerable number of years to provide a running gear chain on each side of the stairway. Each step is provided on each side with a chain wheel, associated with the running gear chain. Also, each step is provided on each side with a trailer wheel. It is desirable that moving stairways operate as smoothly and as noiselessly as possible. Many improvements have been made with the view of aiding in accomplishing this purpose. One of the problems has been the bringing of the trailer wheels smoothly and noiselessly around the bends at the ends of the stairway.

The object of the invention is to eliminate noise incident to the transfer of the trailer wheels from one run to the other at the ends of the stairway.

The invention involves maintaining the trailer wheels in contact with a curved track as they pass around the bend at an end of the stairway. In carrying out the invention, a single track system is provided on each side of the stairway for the trailer wheels, the tracks of the upper and lower runs being connected by curved end tracks at the ends of the stairway. Mechanism is provided for maintaining the trailer wheels in contact with this track on each side of the stairway. This mechanism, according to the preferred arrangement, comprises for each step rotatable means carried by the step and yieldable means acting to exert a force to maintain said rotatable means on track provided therefor and in so doing to exert a force to maintain the trailer wheels for that step on their tracks.

Features and advantages of the invention will be apparent from the following description and appended claims.

In the drawings:—

Figure 2 is an enlarged rear view of one of the steps of the moving stairway of Figure 1; and Figure 3 is a view taken along the line 3—3 of Figure 2.

Figure 1:
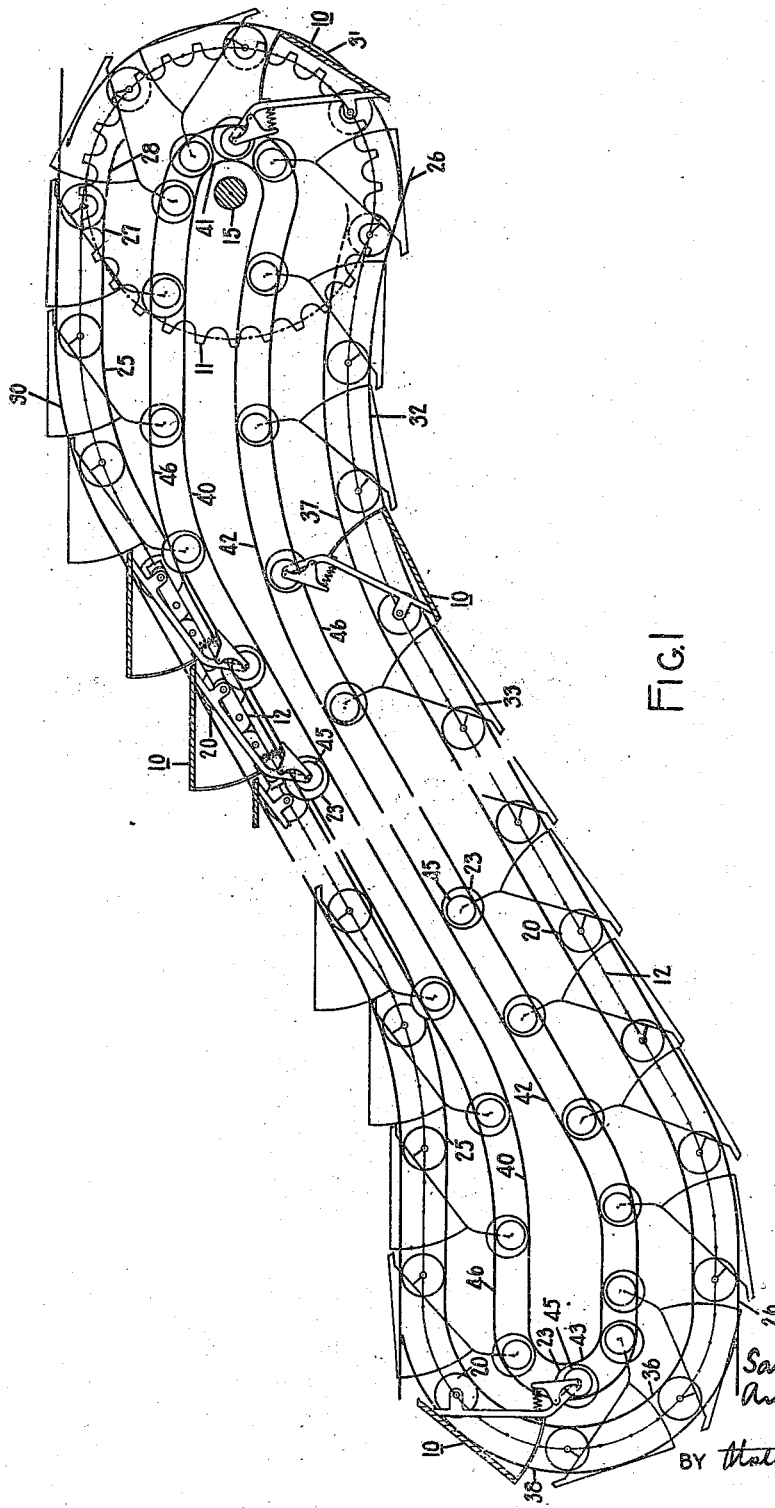
Figure 1 is a diagrammatic representation in side elevation of a moving stairway embodying the invention.

The stairway illustrated is of a present day commercial construction. It comprises an endless series of steps 10 driven at the upper end of the stairway by means of sprocket wheels through running gear chains, a sprocket wheel and chain being arranged on each side of the stairway. A sprocket wheel 11 and running gear chain 12 are illustrated for one side of the stairway. The sprocket wheels are mounted on and driven by the main drive shaft 15, driven in turn by driving mechanism (not shown).

Each step comprises a step frame 16 upon which the tread 17 is mounted. The frame is mounted on brackets 18, one on each side of the stairway. The chain wheels 20 for the step are mounted on an axle 21 extending across the stairway through opposite chain rollers in the running gear chains, the chain wheels being outside the links of the chains. The axle extends into axle blocks 22 secured to one end of step bracket 18 at each side of the stairway. The axle blocks clamp the axle against rotation, the axle being preferably flattened at this point to aid in preventing their turning. Each of the trailer wheels 23 for the step is mounted on a stub axle 24 supported by the other end of the step bracket 18.

An upper run track 25 is provided on each side of the stairway for the chain wheels. Each track at the upper end of the stairway extends beyond the main drive shaft partially around the bend. The track is horizontal up to a point 27 sufficient to cause the step to be flat as it meshes with or emerges from the comb plate and is of such height as to cause the line of travel of the axes of the chain wheels along this horizontal portion of the track to be above a horizontal tangent to the pitch circle of the sprocket wheel. From this point on, the track extends gradually downwardly on a curve of long radius to a point 28 a short distance beyond the vertical line through the center of the main drive shaft where the line of movement of the axes of the chain wheels and the pitch circle of the sprocket wheel meet. The track terminates a short distance beyond this point, being flared at its end.

In the case of an ascending stairway, the chain wheels run on the upper run tracks partially around the bend until the point 28 is reached. As this position is reached, the rollers in the running gear chains through which the chain wheel axle extends mesh with the sprocket wheels 11. With such construction, the transition is effected gradually, noise incident to the meshing of the chain wheel rollers with the sprocket wheels being eliminated. Thereafter the sprocket wheels carry the step around the bend to the point where the chain wheels run onto their return run tracks.

In case of a descending stairway, the reverse of the above described operation takes place.

An up thrust track 30 is provided on each side of the stairway for the chain wheels on their upper run. An out thrust track 31 is provided on each side of the stairway for the chain wheels as they pass around the bend at the upper end. The out thrust tracks are concentric with the sprocket wheels, being of a radius to provide a slight clearance for the chain wheels.

A return run track 26 is provided for the chain wheels on each side of the stairway. Each of these tracks extends from the sprocket wheel and is swung on a curve 32 of long radius into the inclined portion 33. The center of curvature of curved track 32 is such that the curve is tangent to an arc swung about the center of the main drive shaft at a point a short distance toward the incline from the vertical line through the center of the drive shaft and such that a slight operating clearance is provided for the chain wheels at such point.

In the case of an ascending stairway, as the step passes around the bend the chain wheel on each side remains in mesh with the sprocket wheel until after the center of the chain wheel passes a vertical line through the center of the main drive shaft. This is due to the fact that the pull on the chain, in maintaining the following chain roller in mesh with its sprocket, raises the chain wheel. Once the chain has reached the point where the roller for the chain wheel and the next succeeding roller and the roller for the chain wheel next ahead assume a straight line, the chain wheel roller starts to leave the sprocket and, as further movement of the chain takes place, the chain wheel is gradually transferred to the return track. This point is a factor in determining the center of curve 32. From this point on, the chain wheel is maintained on the return track, the curvature of the curved track portion 32 being such as to cause the pull on the chain to exert sufficient downward force on the wheel to hold it on the track. With such construction, the chain rollers corresponding to the chain wheels remain in mesh with the sprocket wheels as the steps pass around the bend until after the chain wheels pass a vertical plane through the main drive shaft. Thereafter they gradually leave the sprocket wheel and the chain wheels gradually move into engagement with the return run tracks. Once the chain wheels engage these tracks, they are maintained thereon so that a gradual and yet positive transition is made, noise incident to the transition being eliminated. In the case of a descending stairway, the reverse of the above described operation takes place.

This track construction insures a noiseless transition to the sprocket wheels from the tracks and from the sprocket wheels to the tracks after wear of the chain wheels takes place. In case of an ascending stairway, as soon as the chain wheels start to wear, the chain rollers through which the chain wheel axle extends mesh with the sprocket wheels sooner in starting around the bend and the chain wheels engage the return run track later after having passed around the bend. In other words, the greater the wear on the chain wheels, the sooner the chain rollers mesh with the sprocket wheel at the top and the later the wheels roll onto the return track at the bottom. In case of a descending stairway, the reverse is true. An adjustment may be provided for the upper run track to raise it at its end to permit resetting of the track after a long period of wear. Such adjustment can be delayed in commercial operation for a considerable period, say for two or three years, as the track construction automatically compensates for wear which would normally occur over a long period of operation.

The chain wheels are illustrated as passing around the bend at the lower end of the stairway on end tracks 36. An up thrust track 37 is provided for each return run track and an end thrust track 38 is provided for each end track 36.

The track system for the trailer wheels for each side of the stairway comprises an upper run track 40, an end track 41 at the upper end of the stairway, a return run track 42 and an end track 43 at the lower end of the stairway, these tracks forming a continuous track system. The track is positioned and shaped to give the proper position to the steps at the various points in their travel. Mechanism is provided for maintaining the trailer wheels in contact with their track, without which the trailer wheels, in passing around the bend from the upper run to the return run at one end of the stairway, would leave the track as the center of gravity of the step shifted to the other side of a vertical plane through the chain wheel axle and would remain off the track until the center of gravity of the step shifted back again at the other end of the stairway. Details of such mechanism, as applied to a stairway with the trailer wheel stub axle construction illustrated, are shown in Figures 2 and 3.

In the form illustrated, this mechanism comprises for each step an extra wheel 45 which may be termed a fifth wheel, a track 46 for this wheel positioned and shaped to provide a path of travel for the wheel corresponding to that of the trailer wheels, and a spring 47 acting oppositely on the fifth wheel and the trailer wheels to exert forces maintaining these wheels on their respective tracks. The track 46 for the fifth wheel is arranged intermediate the trailer wheel tracks, the fifth wheel running on the inside of its track as distinguished from the trailer wheels which run on the outside of their tracks. In the construction illustrated, the track surface for the fifth wheel is outside the track surfaces for the trailer wheels as viewed from the side of the stairway.

The fifth wheel is supported on a stub shaft 48 carried by an arm 50 of a lever 51. This lever is pivotally mounted on a pin 52 supported by lugs 53 on an angle iron 54 extending between and secured to step brackets 18. The spring 47 extends between the end of the other arm 55 of the lever and an angle bracket 59 secured to angle iron 54 and a portion 56 of the step frame bent back from the riser. This spring is arranged on a bolt 57 extending through bracket 59 and secured to the end of arm 55, the length of the bolt from its head to arm 55 being such as to allow for a certain amount of wear of the fifth wheel and the trailer wheels. Spring 47 is a compression spring and exerts a force tending to push arm 55 and the step brackets 18 apart. In other words, there is a scissor-like action through which the spring exerts a force to maintain the trailer wheels and fifth wheel in rolling engagement with their respective tracks. This action takes place regardless of the position of the step in its travel, as may be seen from Figure 1 in which steps are illustrated at various points of step travel. Thus the trailer wheels are maintained in contact with their tracks throughout their travel, thereby eliminating any noise incident to the trailer wheels passing around the bends at the ends of the stairway. With the chain wheel track construction described herein, which is the subject matter of the application of Samuel Gustave Margles, Serial No. 133,771, filed March 30, 1937, and the mechanism for maintaining the trailer wheels in engagement with their tracks, noise incident to the chain wheels and trailer wheels as the steps pass around the bend at an end of the stairway is eliminated.

It is to be understood that other arrangements may be employed to cause the trailer wheels to be maintained on a track system such as illustrated. Also, the invention may be applied to other forms of moving stairway construction, particularly those in which other track arrangements are provided for the chain wheels, the form shown being chosen for convenience of illustration. In other words, the construction of the mechanism for maintaining the trailer wheels on their track system and its association with other parts of the stairway may be arranged to suit the particular installation.

Therefore, as many apparently widely different embodiments of this invention may be made without departing from the scope thereof, it is intended that all matter contained in the above description or shown in the accompanying drawings shall be interpreted as illustrative and not in a limiting sense.

What is claimed is:—

1. A moving stairway comprising; a series of steps; a trailer wheel carried by each of said steps; a continuous track for the trailer wheels; additional means carried by each step; guiding means for said additional means for causing them to travel along a path corresponding to the path of travel of said trailer wheels; and means for each step acting between said trailer wheel and said additional means for that step to exert a force to hold such additional means on its guiding means and such trailer wheel on its track.

2. A moving stairway comprising; a series of steps; a trailer wheel carried by each step; track for guiding said trailer wheels during movement of said steps; rotatable means carried by each step; track for guiding said rotatable means during movement of said steps; and resilient means for each step acting to exert a force to maintain said rotatable means for that step on its track and in so doing to exert a force to maintain said trailer wheel for that step on its track.

3. A moving stairway comprising; a series of steps; a trailer wheel for each step; an additional wheel for each step; a track system for said wheels providing different track surfaces for the trailer wheels and the additional wheels; and a spring for each step acting between said additional wheel and said trailer wheel for that step to exert a force on said additional wheel to hold it against its track surface, the line of travel of said additional wheel provided by its track surface being such that said spring exerts an opposing force on said trailer wheel to hold it against its track surface at all positions of the step in its travel.

4. A moving stairway comprising; a series of steps; a trailer wheel for each step; an additional wheel for each step; a track system for said wheels, said track system causing said additional wheels to have a line of travel corresponding to that of the trailer wheels but providing different track surfaces for the trailer wheels and the additional wheels; and a spring for each step acting between said additional wheel and said trailer wheel for that step to maintain them on their respective track surfaces, regardless of the position of the step in its travel.

5. A moving stairway comprising; a series of steps; a trailer wheel carried by each step; track for guiding said trailer wheels during movement of said steps; an additional wheel carried by each step; track for guiding said additional wheels during movement of said steps, the contour of the last named track being such as to provide the same relationship between said additional wheel and trailer wheel for each step at all points in their travel; and a spring for each step acting oppositely on said additional wheel and trailer wheel for that step to exert a force to maintain these wheels on their respective tracks at all positions of the step in its travel.

6. A moving stairway comprising; a series of steps, each step having a trailer wheel supported by the step framework; a continuous track for the trailer wheels; and means for maintaining said trailer wheels on the surface of said track, regardless of the position of the step in its travel, said means comprising an additional continuous track of a contour corresponding to that of the trailer wheel track, an additional wheel for each step carried by said step framework of said step for running on said additional track, and a compression spring for each step acting between said additional wheel and said trailer wheel for such step to push them against the track surfaces of their respective tracks.

7. A moving stairway comprising; a series of steps; a pair of chain wheels carried by each step, one on each side thereof; a pair of trailer wheels carried by each step, one on each side thereof; track on each side of the stairway for guiding said trailer wheels during movement of said steps; a fifth wheel carried by each step between said trailer wheels; track for guiding said fifth wheels during movement of said steps, the contour of the last named track being such as to provide the same relationship between said fifth wheel and trailer wheels for each step at all points in their travel; a compression spring for each step; and means for each step actuated by said spring for that step to act in opposite directions on said fifth wheel and trailer wheels for that step to exert a force to maintain these wheels on their respective tracks at all positions of the step in its travel.

8. A moving stairway comprising; a series of steps, each step having a trailer wheel on each side thereof supported by the step framework; a track on each side of the stairway for the trailer wheels, each track having an upper run portion, a return run portion and a curved portion at each end of the stairway, the outer surface of the track serving as the track surface; and means for maintaining said trailer wheels on each side of the stairway on the track surface of their respective tracks, said means comprising a lever for each step pivotally supported by the framework of that step, an additional wheel for each step carried by said lever for that step, a track for said additional wheels corresponding to said trailer wheel tracks, the inner surface of said additional wheel track serving as the track surface for said additional wheels, and a compression spring for each step acting through said lever and said step framework for that step to push said additional wheel and trailer wheels for such step against their respective track surfaces, regardless of the position of the step in its travel.

9. A moving stairway comprising; a series of steps, each step having a chain wheel and a trailer wheel on each side thereof, the framework of each step including a step bracket on each side of the step supporting at opposite ends thereof the chain wheel and trailer wheel on that side of the step; a continuous single track on each side of the stairway for the trailer wheels, the outer surface of the track serving as the track surface; and means for maintaining said trailer wheels on the track surface of said track on each side of the stairway, said means comprising a lever for each step pivotally supported between its ends by the framework of that step, an additional wheel for each step carried by one end of said lever for that step, a continuous single track for said additional wheels providing a line of travel thereof corresponding to that of said trailer wheels, the inner surface of said additional wheel track serving as the track surface for said additional wheels, and a compression spring for each step arranged between the other end of said lever and said member for that step acting through such lever and said brackets for that step to push said additional wheel and trailer wheels for such step against their respective track surfaces, regardless of the position of the step in its travel.

10. A moving stairway comprising; a series of steps, each step having a chain wheel and a trailer wheel on each side thereof, the framework of each step including a step bracket on each side of the step supporting at opposite ends thereof the chain wheel and trailer wheel on that side of the step; a track system on each side of the stairway for the trailer wheels comprising an upper run track, a return run track and a curved track at each end of the stairway forming a continuous single track, the outer surface of the track serving as the track surface; and means for maintaining said trailer wheels on the track surface of said track on each side of the stairway, said means comprising a member extending between the step brackets of each step, a lever for each step pivotally supported between its ends by said member for that step, a fifth wheel for each step carried by one end of said lever for that step, a track system for said fifth wheels forming a continuous single track and providing a line of travel of said fifth wheels corresponding to that of said trailer wheels, the inner surface of said fifth wheel track serving as the track surface for said fifth wheels, the plane of such track surface being outside that of the track surface for the trailer wheels, and a compression spring for each step arranged between the other end of said lever and said member for that step acting through such lever and said brackets for that step to push said fifth wheel and trailer wheels for such step against their respective track surfaces, regardless of the position of the step in its travel.

SAMUEL GUSTAVE MARGLES.
ANDREW FABULA.